United States Patent
Shah et al.

(10) Patent No.: US 11,403,519 B2
(45) Date of Patent: *Aug. 2, 2022

(54) MACHINE LEARNING NETWORK IMPLEMENTED BY STATICALLY SCHEDULED INSTRUCTIONS, WITH SYSTEM-ON-CHIP

(71) Applicant: SiMa Technologies, Inc., San Jose, CA (US)

(72) Inventors: Nishit Shah, Sunnyvale, CA (US); Reed Kotler, San Jose, CA (US); Srivathsa Dhruvanarayan, Saratoga, CA (US); Moenes Zaher Iskarous, San Jose, CA (US); Kavitha Prasad, San Jose, CA (US); Yogesh Laxmikant Chobe, Santa Clara, CA (US); Sedny S. J Attia, Santa Cruz, CA (US); Spenser Don Gilliland, San Jose, CA (US)

(73) Assignee: SiMa Technologies, Inc., San Jose, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/841,601

(22) Filed: Apr. 6, 2020

(65) Prior Publication Data

US 2021/0312322 A1 Oct. 7, 2021

Related U.S. Application Data

(63) Continuation of application No. 16/840,216, filed on Apr. 3, 2020.

(51) Int. Cl.
*G06N 3/06* (2006.01)
*G06N 3/063* (2006.01)
(Continued)

(52) U.S. Cl.
CPC ............. *G06N 3/063* (2013.01); *G06F 8/41* (2013.01); *G06F 9/30087* (2013.01); *G06N 20/00* (2019.01)

(58) Field of Classification Search
CPC ........ G06N 20/00; G06N 3/04; G06N 3/0454; G06N 3/063; G06F 8/41; G06F 9/30087
See application file for complete search history.

(56) References Cited

U.S. PATENT DOCUMENTS 9,928,460 B1   3/2018 Nowatzyk et al.
2019/0004878 A1*  1/2019 Adler ................... G06F 9/3005
(Continued)

OTHER PUBLICATIONS

Guha, "Deepframe: A Profile-driven Compiler for Spatial Hardware Accelerators", 2019 28th International Conference on Parallel Architectures and Compilation Techniques. (Previously supplied). (Year: 2019).*

(Continued)

*Primary Examiner* — Dave Misir
(74) *Attorney, Agent, or Firm* — Fenwick & West LLP

(57) ABSTRACT

A compiler receives a description of a machine learning network and generates a computer program that implements the machine learning network. The computer program includes statically scheduled instructions that are executed by a mesh of processing elements (Tiles). The instructions executed by the Tiles are statically scheduled because the compiler can determine which instructions are executed by which Tiles at what times. For example, for the statically scheduled instructions, there are no conditions, branching or data dependencies that can be resolved only at run-time, and which would affect the timing and order of the execution of the instructions.

20 Claims, 16 Drawing Sheets

(51) Int. Cl.
*G06F 8/41* (2018.01)
*G06F 9/30* (2018.01)
*G06N 20/00* (2019.01)

(56) References Cited

U.S. PATENT DOCUMENTS

| | | | | |
|---|---|---|---|---|
| 2019/0018815 | A1* | 1/2019 | Fleming | G06F 13/423 |
| 2019/0076031 | A1* | 3/2019 | Valys | A61B 5/361 |
| 2019/0155768 | A1* | 5/2019 | Wilkinson | G06F 15/16 |
| 2019/0273662 | A1 | 9/2019 | Mwanje et al. | |
| 2019/0286973 | A1* | 9/2019 | Kovvuri | G06F 8/451 |
| 2019/0303346 | A1 | 10/2019 | Brewer | |
| 2019/0391796 | A1* | 12/2019 | Brady | G06F 8/458 |
| 2020/0007342 | A1 | 1/2020 | Liem et al. | |
| 2020/0012536 | A1* | 1/2020 | Lacey | H04L 67/1097 |
| 2020/0012537 | A1 | 1/2020 | Lacey et al. | |
| 2020/0073830 | A1* | 3/2020 | Verrilli | H04L 12/46 |
| 2020/0090383 | A1 | 3/2020 | Dwivedi | |
| 2020/0133914 | A1* | 4/2020 | Wilkinson | G06F 15/17325 |
| 2020/0150713 | A1* | 5/2020 | Knowles | G06F 9/3009 |
| 2021/0201526 | A1* | 7/2021 | Moloney | G06N 3/084 |

OTHER PUBLICATIONS

Andri, "YodaNN: An Architecture for Ultralow Power Binary-Weight CNN Acceleration", IEEE Transactions on Computer-Aided Design of Integrated Circuits and Systems, vol. 37, No. 1, Jan. 2018. (Year: 2018).*

Jiao, "A 12nm Programmable Convolution-Efficient Neural-Processing-Unit Chip Achieving 825TOPS", ISSCC 2020 / Feb. 18, 2020. (Year: 2020).*

Everson, "A 104.8TOPS/W One-Shot Time-Based Neuromorphic Chip Employing Dynamic Threshold Error Correction in 65nm", IEEE Asian Solid-State Circuits Conference Nov. 5-7, 2018/Tainan, Taiwan. (Year: 2018).*

Du, "ShiDianNao: Shifting Vision Processing Closer to the Sensor", ISCA'15, Jun. 13-17, 2015, Portland, OR, USA. (Year: 2015).*

Shawahna, "FPGA-Based Accelerators of Deep Learning Networks for Learning and Classification: A Review", IEEE Access, 2018. (Year: 2018).*

Reuther, "Survey and Benchmarking of Machine Learning Accelerators", IEEE, 2019. (Year: 2019).*

Ankit, "PUMA: A Programmable Ultra-efficient Memristor-based Accelerator for Machine Learning Inference", ASPLOS'19, Apr. 13-17, 2019, Providence, RI, USA. (Year: 2019).*

International Search Report and Written Opinion, Patent Cooperation Treaty Application No. PCT/US2021/025001, dated Jun. 10, 2021, 14 pages.

Guha, A. et al., "Deepframe: A Profile-Driven Compiler for Spatial Hardware Accelerators," 2019 28th International Conference on Parallel Architectures and Compilation Techniques (PACT), Sep. 23-26, 2019, pp. 68-81.

United States Office Action, U.S. Appl. No. 16/840,216, dated Sep. 3, 2021, 17 pages.

United States Office Action, U.S. Appl. No. 16/841,598, dated Sep. 30, 2021, 19 pages.

* cited by examiner

| | C 1-4 | C 5-12 | C 13-16 | C 17-24 | C 25-28 | C 29-32 | C 33-40 |
|---|---|---|---|---|---|---|---|
| Tile 1 | Load W1,X1 | P1=W1xX1 | Load W2,X2 | P2=W2xX2 | P3=P1+P2 | Load W3,X3 | P4=W3xX3 |

| | C 41-44 | C 45-48 | C 49-56 | C 57-60 | C 61-64 | C 65-68 |
|---|---|---|---|---|---|---|
| Tile 1 | P5=P3+P4 | Load W4,X4 | P6=W4xX4 | P7=P5+P6 | Y=F(P7) | Store Y |

FIG. 4A

| | C 1-4 | C 5-20 | C 21-24 | C 25-28 | C 29-32 | C 33-36 | C 37-40 | C 41-44 |
|---|---|---|---|---|---|---|---|---|
| Tile 1 | Load W1,X1 | P1=W1xX1 | Move P1 to Tile 2 | | | | | |
| Tile 2 | Load W2,X2 | P2=W2xX2 | [P1 available] | P5=P1+P2 | Move P5 to Tile 4 | | | |
| Tile 3 | Load W3,X3 | P3=W3xX3 | Move P3 to Tile 4 | | | | | |
| Tile 4 | Load W4,X4 | P4=W4xX4 | [P3 available] | P6=P3+P4 | [P5 available] | P7=P5+P6 | Y=F(P7) | Store Y |

FIG. 4B

| | C 1-4 | C 5-20 | C 21-24 | C 25-28 | C 29-32 | C 33-36 | C 37-40 | C 41-44 | C 45-48 |
|---|---|---|---|---|---|---|---|---|---|
| Tile 1 | Load W1,X1 | P1=W1xX1 | Move P1 to Tile 5 | | | | | | |
| Tile 2 | Load W2,X2 | P2=W2xX2 | Move P2 to Tile 5 | | | | | | |
| Tile 3 | Load W3,X3 | P3=W3xX3 | Move P3 to Tile 6 | | | | | | |
| Tile 4 | Load W4,X4 | P4=W4xX4 | Move P4 to Tile 6 | | | | | | |
| Tile 5 | | | [P1,P2 Available] | P5=P1+P2 | Move P5 to Tile 7 | | | | |
| Tile 6 | | | [P3,P4 Available] | P6=P3+P4 | Move P6 to Tile 7 | | | | |
| Tile 7 | | | | | [P5,P6 Available] | P7=P5+P6 | Move P7 to Tile 8 | | |
| Tile 8 | | | | | | | [P7 Available] | Y=F(P7) | Store Y |

FIG. 4C

MACHINE LEARNING NETWORK IMPLEMENTED BY STATICALLY SCHEDULED INSTRUCTIONS, WITH SYSTEM-ON-CHIP

CROSS-REFERENCE TO RELATED APPLICATION(S)

This application is a continuation of U.S. patent application Ser. No. 16/840,216, "Machine Learning Network Implemented by Statically Scheduled Instructions, with Compiler," filed Apr. 3, 2020. The subject matter of all of the foregoing is incorporated herein by reference in their entirety.

BACKGROUND

1. Technical Field

This disclosure relates, in general, to the implementation of machine learning networks on hardware.

2. Description of Related Art

Machine learning is one of the most powerful recent trends in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether (or to what confidence level) objects are present within the images.

Machine learning networks typically require the handling of a large volume of data and the execution of a large number of computations. As a result, they are commonly implemented in compute facilities with access to significant resources, such as in the cloud or on server clusters. However, the sources of input to machine learning networks may be located remotely from these compute facilities. For example, cameras and other types of sensors may be located on the edge of the network. Example applications for edge devices include automotive and other forms of transportation including autonomous transportation, agricultural, industrial, robotics, drones, surveillance and security, smart environments including smart cities, medical, and personalized health. Example tasks include computer vision, image analysis, image understanding, speech recognition, audio analysis, audio understanding, natural language processing, classification and pattern recognition tasks. For edge devices, it may be desirable to perform certain tasks in real-time. In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. Thus, one common paradigm is for the input sources to be web-based so that they can continuously send their captured data to the cloud-based compute facility, which then executes the machine learning network and returns the result.

However, there can be many advantages if the machine learning network and computing elements on which it executes was instead embedded on edge devices, such as combined with the camera system.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 4A illustrates an implementation of an MLN subnet utilizing a low number of Tiles.

FIG. 4B illustrates an implementation of an MLN subnet with low latency.

FIG. 4C illustrates an implementation of an MLN subnet with high throughput.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
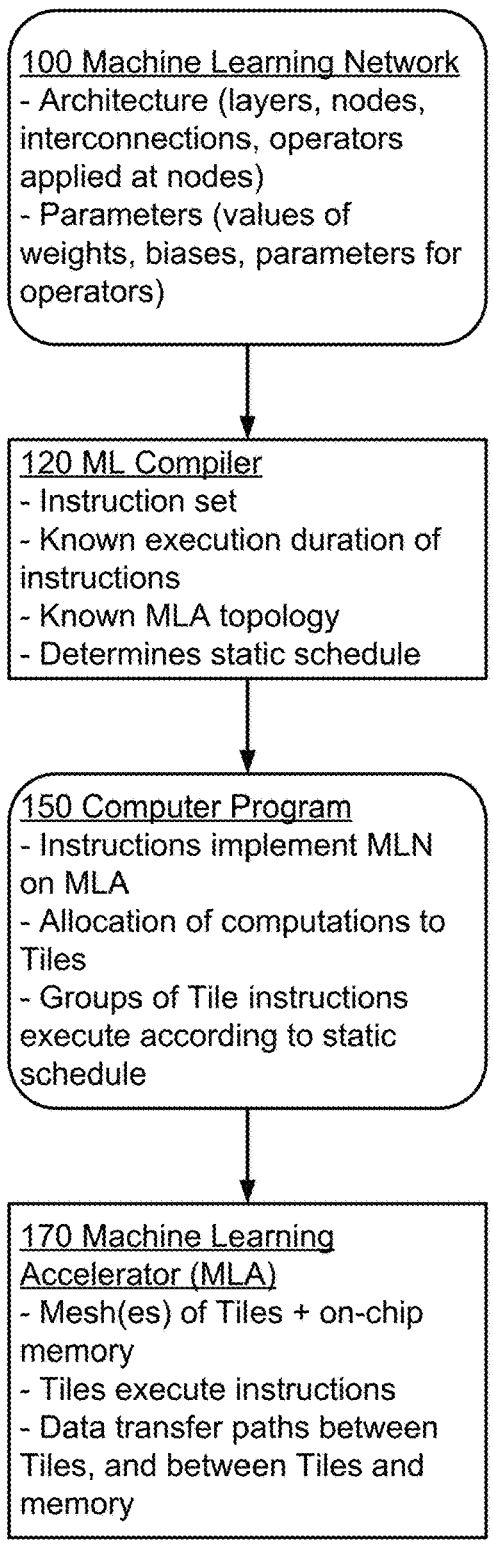
FIG. 1A is a block diagram of a system with a machine learning accelerator (MLA) and corresponding compiler, according to the invention.
Figure 1A:
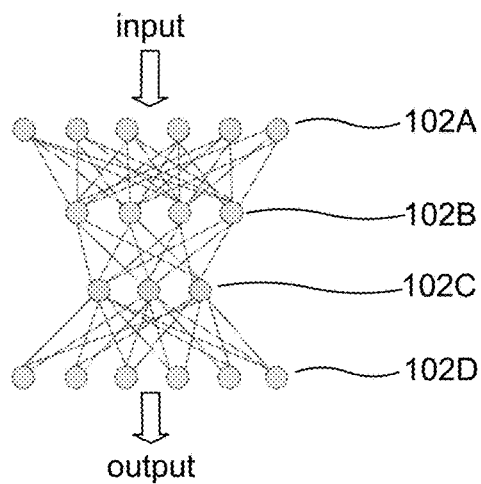
Figure 1A:
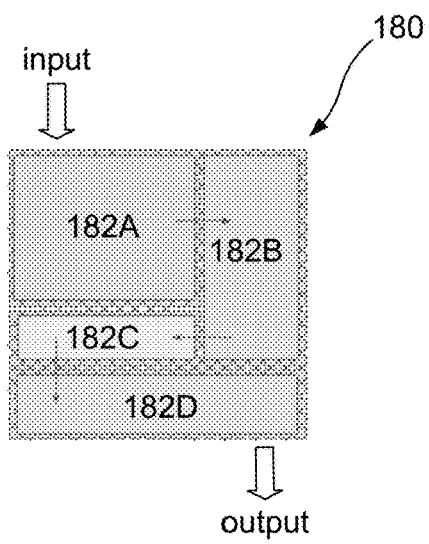

FIG. 1A is a block diagram of one example of a system with a machine learning accelerator (MLA) 170 and corresponding compiler 120, according to the invention. The compiler 120 receives a description of a machine learning network 100 and generates a computer program 150 that implements the machine learning network using MLA 170. The computer program 150 includes instructions that are executed by processing elements (Tiles) in the MLA according to a schedule determined by the compiler. For convenience, these will be referred to as statically scheduled instructions. The instructions executed by the Tiles (Tile instructions) are statically scheduled because the compiler can determine which instructions are executed by which Tiles at what times, as will be explained in greater detail below. For example, for the statically scheduled instructions, there are no conditions, branching or data dependencies that can be resolved only at run-time, and which would affect the timing and order of the execution of the instructions. Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

In more detail, the MLN 100 may be described by an architecture and parameters. A depiction of an MLN is shown to the right of box 100 in FIG. 1A. Most MLNs include multiple layers 102, each with one or more nodes which are represented by circles in FIG. 1A. The lines between nodes in FIG. 1A represent interconnections between the nodes (and layers). Each node calculates a weighted sum of the values received from its connected nodes, possibly also applying a bias. Examples are matrix multiplication and convolution. Each node may also apply certain functionality (operators), such as nonlinear functions (e.g., tan h function), softmax operator, etc. A typical node may compute an output:

$$y = F(\Sigma w_i x_i + b) \quad (1)$$

where $x_i$ are the inputs received from other nodes i, $w_i$ are weights, b is a bias and F( ) is a nonlinear operator. The MLN architecture includes the number of nodes (and layers) and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 100 or more layers. Examples of inputs include text, images and video. Some of the layers may be fully interconnected (i.e., every node in one layer provides input to every node in the next layer), and others may be more locally interconnected (e.g., to implement convolutions). Each weighted interconnect represents a scalar multiplication. The total number of scalar multiplications required to implement an MLN may be on the order of millions, billions, tens of billions or even more. These may be carried out by matrix multiplications.

The MLA 170 includes a plurality of Tiles 180 and an on-chip memory system implemented on a semiconductor die. The Tiles are organized into one or more meshes of interconnected Tiles. A depiction of a Tile mesh is shown to the right of box 170 in FIG. 1A. In each mesh, the Tiles 180 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 1A, the computations performed by layers 102A-D are allocated to groups 182A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 120 receives a description of the MLN 100 and generates a computer program 150 that implements the MLN using the MLA 170. The computer program 150 receives an input sample for the MLN and executes the operations of the MLN to produce the output for the MLN. The computer program 150 includes instructions to be executed by the Tiles for implementing computations in the MLN and may also include instructions to be executed by other elements, such as a controller outside the Tiles.

Figure 1B:
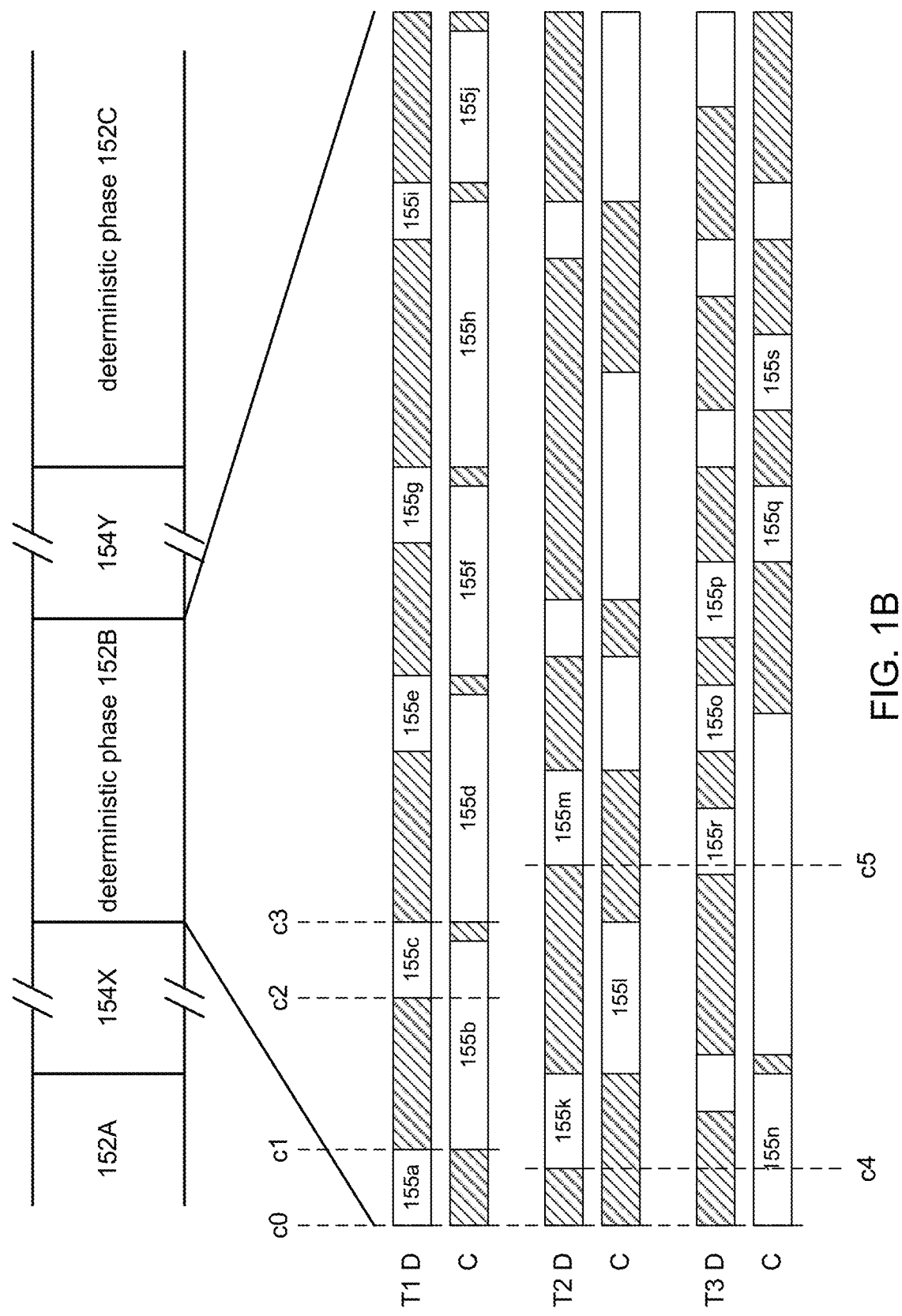
FIG. 1B illustrates partitioning a computer program into deterministic and non-deterministic phases.

As shown in FIG. 1B, the compiler partitions the Tile instructions into one or more deterministic phases 152A,B,C which typically utilize multiple Tiles. The instructions in a deterministic phase 152 may be statically scheduled by the compiler. For example, a deterministic phase 152 may include a series of computations required to implement a portion of the MLN, where the time required for each computation and associated data transfers is known. As a result, the compiler may statically schedule the Tile instructions within that deterministic phase relative to the other Tile instructions in the phase. The resulting computer program produced by the compiler then implements an allocation of instructions to Tiles and a schedule for executing the instructions as determined by the compiler, although these may not be expressly contained within the computer program. In the example of FIG. 1A, the computations performed by layers 102A-D are allocated to groups 182A-D of Tiles as indicated. In addition, all of the Tile instructions (including both for computation and for data transfer) are executed in a single deterministic phase.

The computer program may also include non-deterministic phases 154X,Y. For example, non-deterministic phases 154 may include data fetch or instruction fetch from off-chip memory where the time required to execute the operation varies too much to allow reliable synchronization with other operations. Other examples include computations that occur off-chip, and conditions, branching and other programmatic constructs that depend on values not known until run-time. The breaks in the rectangles for the non-deterministic phases 154 indicate that the timing is not deterministic, whereas the deterministic phases 152 are represented by rectangles without breaks. In FIG. 1B, the deterministic and non-deterministic phases are shown as alternating. This is not required. For example, deterministic and non-deterministic phases may execute concurrently.

FIG. 1B also shows more detail of deterministic phase 152B, which shows the static schedule computed by the compiler for executing Tile instructions in this phase. The phase 152B begins at some time when all of the Tiles are synchronized, which for convenience is marked as cycle c0 in FIG. 1B. The Tiles may have circuitry that synchronizes the Tiles. For example, each Tile may monitor when it is ready to begin execution of a deterministic phase 152B and then actual execution begins when all Tiles signal that they are ready. Alternatively, an external controller may synchronize the Tiles and start the deterministic phase 152B when all Tiles are ready.

In this example, the instructions are executed by three Tiles, as denoted by T1, T2 and T3. Each Tile has two pipelines: a "D" pipeline for executing data transfer instructions and a "C" pipeline for executing compute instructions. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 155$a$ transfers data into Tile 1 and instruction 155$b$ then performs a computation that consumes that data. Instruction 155$b$ is dependent on instruction 155$a$. Here, the T1 C pipeline is not required to continuously poll the T1 D pipeline at run-time for when the data is available, and run-time message passing between the pipelines is not required to indicate that the data is available. Rather, because the duration (i.e., time required to execute) of instruction 155$a$ is known, the compiler knows when the data will be available (for convenience, marked as cycle c1 in the figure) and can construct a static schedule in which instruction 155$b$ starts execution then. The duration of instruction 155$b$ is also known, so the compiler knows that compute instruction 155$d$ may start after instruction 155$b$. In this case, the compiler determines a static schedule in which instruction 155$d$ starts at cycle c3. Compute instruction 155$d$ depends on data brought into the Tile by instruction 155$c$. The duration of instruction 155$c$ is known, so the compiler knows that in the static schedule, instruction 155$c$ must start at cycle c2 or earlier. This pattern is repeated for pairs of data transfer instructions and compute instructions 155$e$-$f$, 155$g$-$h$, 155$i$-$j$.

For Tile 2, compute instruction 155$l$ depends on data from data transfer instruction 155$k$. However, instruction 155$k$ does not start immediately at cycle c0. Rather, it has a delayed start at cycle c4. This may be because the data transfer path required by instruction 155$k$ is occupied by some other data transfer instruction and is not available until cycle c4. The start time of instruction 155$k$ in the static schedule is not determined by run-time arbitration or contention mechanisms for the shared data transfer path. Rather, the compiler knows that the data transfer path is occupied since the compiler knows the start times and durations of all the instructions, so the compiler simply creates a static schedule in which instruction 155$k$ does not start until cycle c4 when the compiler knows the data transfer path will be available. Similarly, data transfer instruction 155$m$ has a delayed start time. Perhaps the T2 D pipeline is being used to transfer out the results of computation 155$l$ and does not become available until cycle c5.

For Tile 3, computation 155$n$ starts immediately at cycle c0. Perhaps the required data was loaded into Tile 3 during some prior phase. Data transfer instructions 155$o$ and 155$p$ load data for compute instruction 155$q$. They are separated in time, perhaps because different pieces of data were not available or the data transfer paths were not available until those times. As a final example, data transfer instruction 155$r$ loads data for compute instruction 155$s$. In the static schedule, the compiler places instruction 155$r$ well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 1B, the computer program may specify that instruction 155$a$ executes at cycle c0, instruction 155$b$ at cycle c1, instruction 155$c$ at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 155$a$ will end at cycle c1 and instruction 155$b$ is supposed to begin at cycle c1. It may fill the space between cycles c0 and c1 with NO-OPs for the T1 C pipeline. The T1 C pipeline then just continuously executes instructions from its queue, and the NO-OPs ensure that instruction 155$b$ is executed according to the compiler's static schedule. In yet another approach, the static schedule may be implemented by hardware. The T1 C pipeline may just stall on the execution of instruction 155$b$ until the data from instruction 155$a$ is ready. The compiler knows that data will be ready at cycle c1 and, therefore, instruction 155$b$ will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

In order to statically schedule the instructions in a deterministic phase, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided. FIGS. 4 and 5 provide further examples of how the compiler converts a description of an MLN to a deterministic phase of statically scheduled instructions executed by the Tiles.

Other aspects include components, devices, systems, improvements, methods, processes, applications, computer readable mediums, and other technologies related to any of the above.

Figure 2A:
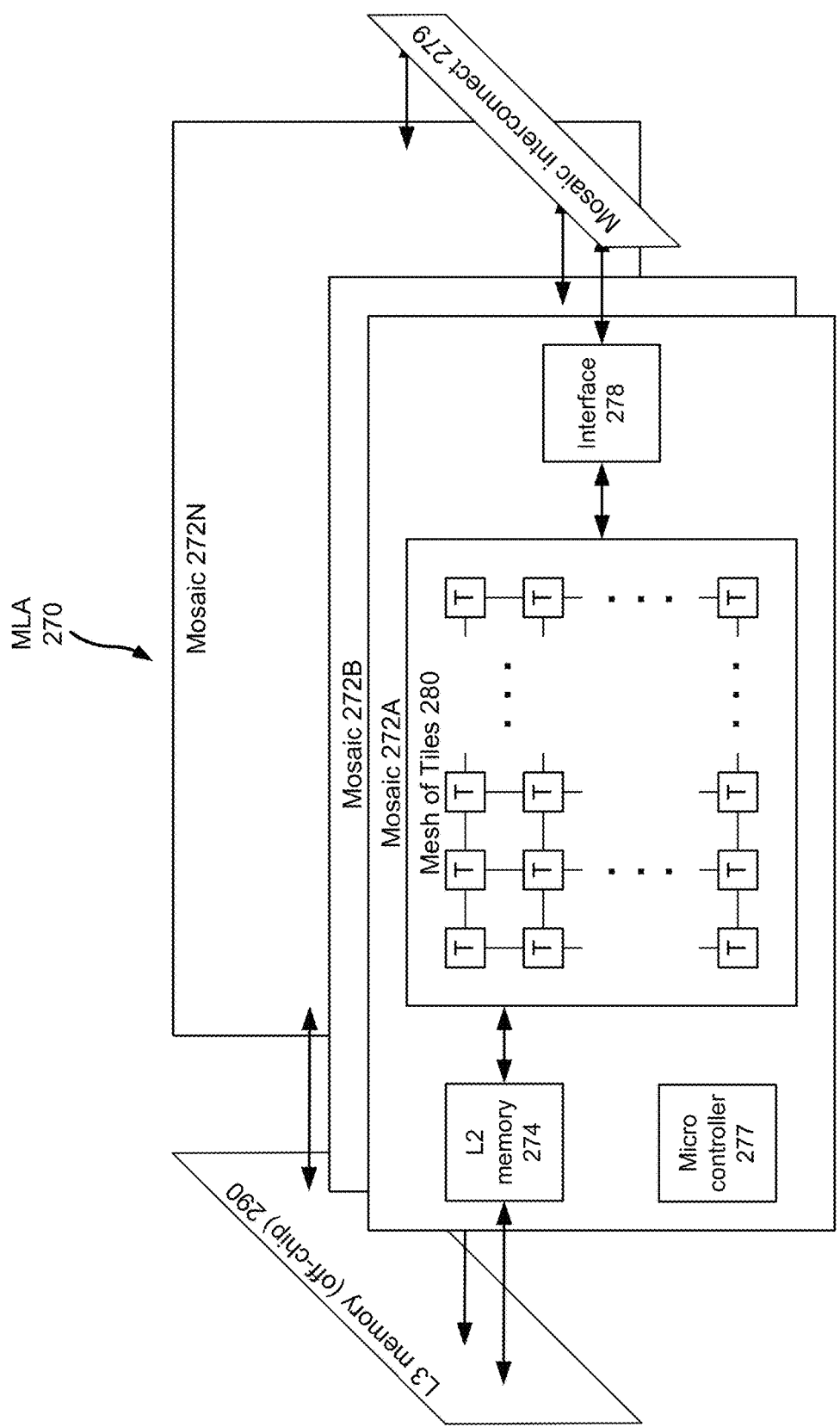
FIG. 2A is a block diagram of a hardware system, including an MLA.
Figure 2B:
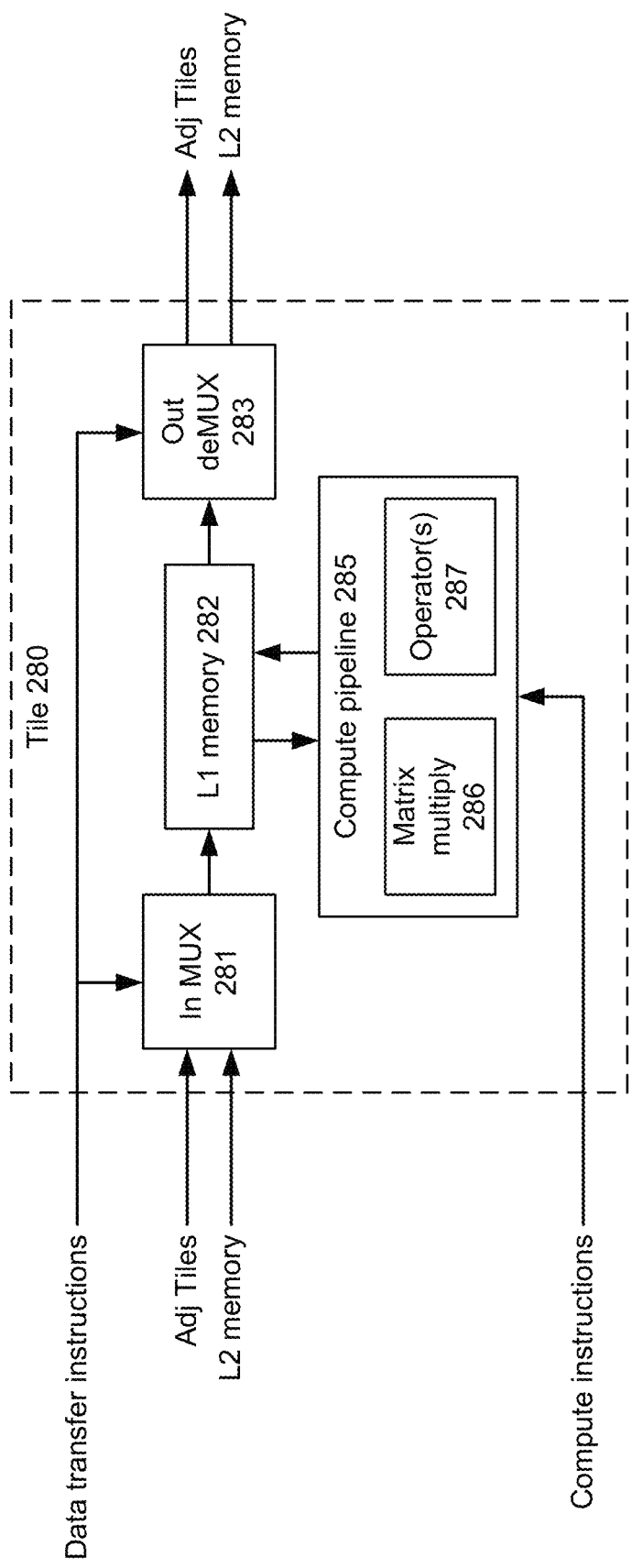
FIG. 2B is a block diagram of a Tile within an MLA.
Figure 3:
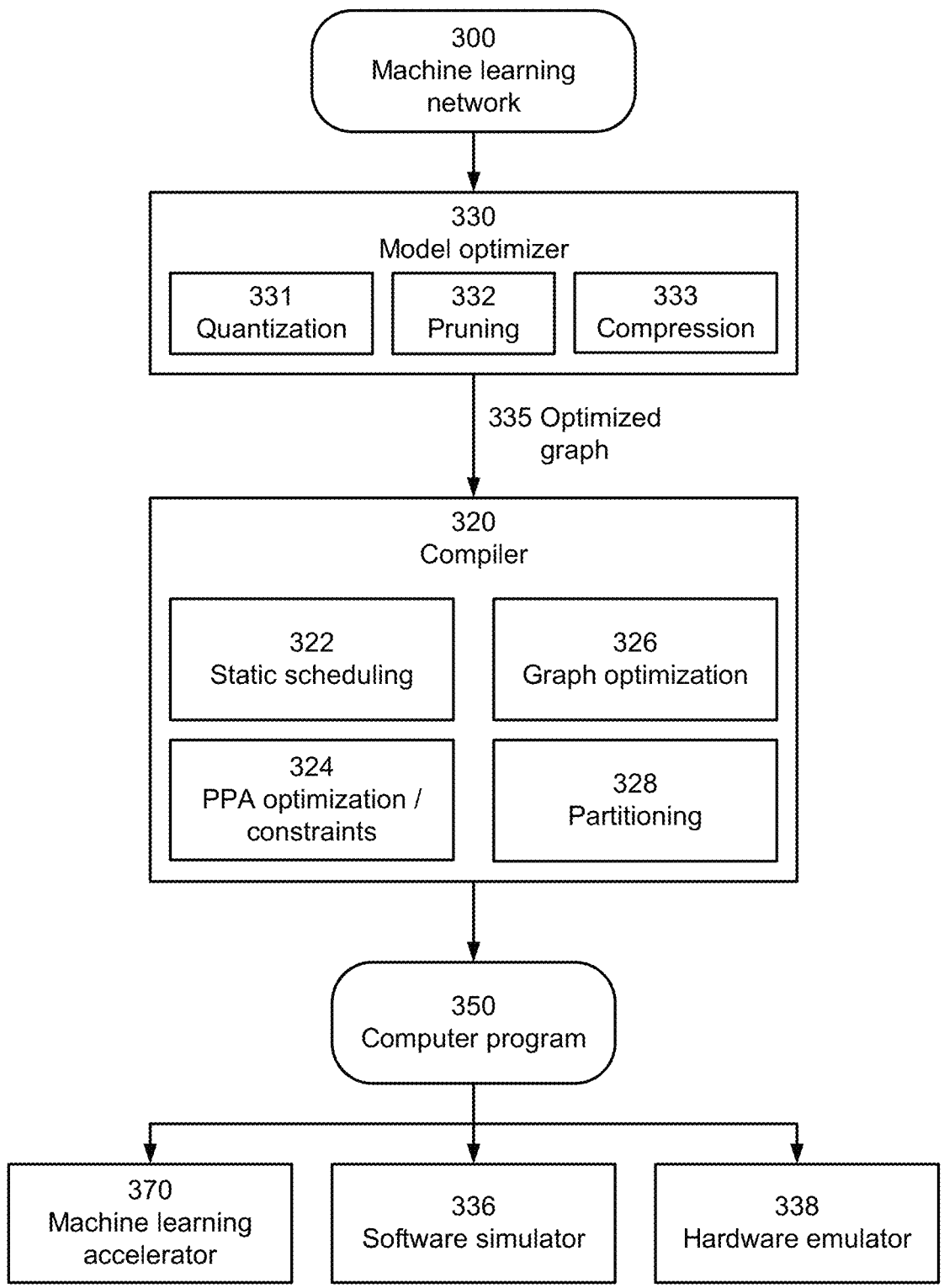
FIG. 3 is a block diagram of a software development environment, including an ML compiler.

FIGS. 2-3 are more detailed descriptions of an example system that includes an MLA and corresponding compiler. FIG. 2 shows the hardware component and FIG. 3 shows the software development environment.

FIG. 2A is a block diagram of a hardware system including an MLA 270. The MLA 270 includes all the components shown in FIG. 2A, except the off-chip L3 memory 290. The MLA components are implemented on a single die as part of a single chip. The MLA 270 includes one or more mosaics 272A-N. In this example, all of the mosaics are the same. Each mosaic 272 includes a mesh of Tiles 280, an on-chip memory system and a controller 277. In FIG. 2A, the on-chip memory system is a multi-level memory system, which includes a level 1 (L1) memory distributed among the Tiles (see FIG. 2B) and a level 2 (L2) memory 274 shared by the Tiles. If there are multiple mosaics 272, the MLA 270 may include a dedicated interconnect 279 for connecting the different mosaics. Each mosaic also includes an interface 278 to the interconnect 279.

FIG. 2B is a block diagram of a Tile 280 within the MLA. In this example, all the Tiles are the same. Each Tile 280 includes an L1 memory 282. Each Tile 280 also includes a data transfer pipeline that executes instructions for transferring data to and from the L1 memory 282. Here, the Tiles 280 are arranged in a rectangular array as shown in FIG. 2A, with each Tile connected to its adjacent neighbors. Interior Tiles are connected to four adjacent Tiles. Edge Tiles are connected to adjacent Tiles and also to L2 memory 274. In FIG. 2B, the L1 memory 282 may receive data from any of its adjacent Tiles and/or from L2 memory if it is an edge Tile. Similarly, it may transfer data to any of its adjacent Tiles and/or to L2 memory if it is an edge Tile. The data transfer operations are controlled by data transfer instructions received and executed by the Tiles.

Each Tile 280 also includes a compute pipeline 285 for executing computations using data stored in the L1 memory 282. The L1 memory acts as software-configurable registers for the compute pipeline 285. The compute pipeline 285 includes matrix multiplication circuitry 286, such as a systolic array, and circuitry for implementing different types of operators 287. The computations are controlled by compute instructions received and executed by the Tiles.

In this particular example, all of the data transfer instructions and compute instructions executed by the Tiles are statically scheduled. These instructions include data transfer between L1 memories in different Tiles, and data transfer between L1 memory and L2 memory. Data transfer instructions may specify one hop at a time (e.g., transfer data to the east neighbor Tile) or may specify destination and path through intermediate Tiles (e.g., transfer data to Tile (5,5) using path east-east-north-north-east). The instructions also include matrix multiplies performed by the Tiles and operators applied by the Tiles. These operations do not require very many different instructions to implement, so the overall instruction set may be fairly small, for example not more than 20 instructions, or not more than 50 instructions.

The L3 memory 290 is off-chip. In this example, the L1 and L2 memories are implemented as on-chip SRAM and the L3 memory is implemented as DRAM (flash memory and SSD drives are other alternatives). Because the L1 and L2 memories are implemented as SRAM, the data transfers between L1 memories or between L1 and L2 memories have deterministic timing, so these data transfer instructions can be statically scheduled by the compiler. However, data transfer from off-chip DRAM is more unpredictable in timing. As a result, these instructions are non-deterministic in nature and they are executed by the microcontroller 277. Therefore, they are executed in one of the non-deterministic phases and they are not statically scheduled.

In one approach, the instructions in the computer program and the data required for computation (e.g., input, weights, biases, parameters for operators) are initially loaded into L3 memory 280. From time to time, instructions and associated data are transferred from L3 memory into L1/L2 memory during a non-deterministic phase since the timing of data transfers from DRAM is not deterministic. Once these instructions and data are loaded into L1/L2 memory, the computer program enters a corresponding deterministic phase in which the Tiles execute the loaded instructions according to a static schedule. The non-deterministic and deterministic phases may occur concurrently. For example, data may be continuously streamed into the L1/L2 memory during the non-deterministic phase, with the corresponding statically scheduled instructions from the deterministic phase consuming that data. In one approach, the Tiles execute only statically scheduled instructions, and all non-statically scheduled instructions are executed by processing elements outside the Tile mesh, for example, the microcontroller 277.

SRAM has predictable timing so implementing the L1 and L2 memories as SRAM allows the compiler to statically schedule data transfers from those memories into the Tiles for computation. However, there is a limit to the amount of SRAM that may be implemented on a die. In order to increase the effective size of SRAM, a virtual SRAM approach may be used. In one approach, the compute instructions that consume certain data are not fetched into the Tiles until after the corresponding data have been transferred from DRAM (L3 memory) to SRAM (L1/L2 memory). This guarantees that the compute instructions will not be executed by the Tiles before the data is available. All data effectively will appear as if it is transferred to the Tiles from SRAM for computation, even if all of the data would not fit into the available SRAM.

L2 memory may also be used to temporarily store interim values that are too voluminous to store in L1 memory. For example, a layer K of the MLN may produce a large amount of data at its output, to be used as input to the next layer K+1. The layer K output may be stored in L2 memory and then retrieved from L2 memory as needed for the next layer's computations. This may be implemented using a ping pong buffer approach when multiple input samples are processed as a pipeline. The L2 memory is divided into two regions A and B. When a first input sample is processed, the layer K output is stored in region A of the L2 memory. The computations for layer K+1 retrieve the stored values from region A. At the same time, the second input sample is processed and the layer K output is stored in region B of the L2 memory. The two regions then alternate, with the Tiles implementing layer K storing to one region while the Tiles implementing layer K+1 read from the other region. The synchronization is implemented by the static scheduling. The compiler knows when regions AB will be ready and the instructions to implement layer K+1 will execute after that time. No synchronization primitives are needed.

FIG. 3 is a block diagram of a software development environment including an ML compiler 320. In this example, the software development environment also includes a model optimizer 330. The model optimizer 330 receives a description of the MLN 300 and produces an optimized graph 335 of the MLN. It may apply optimizations such as quantization 331, pruning 332 and/or compression 333. Quantization 331 reduces the resolution of calculated values. For example, floating point values may be quantized to a certain number of bits and then integer math used instead of floating point math. This reduces the complexity and power consumed by the Tiles. Pruning 332 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 335 of the MLN may be expressed as a graph, in which the nodes of the graph represent nodes in the MLN and the edges of the graph represent the weighted interconnects. The compiler 320 receives the optimized graph 335 and produces the resulting computer program 350. The compiler 320 may perform operations including static scheduling 322, PPA (power performance area) optimizations 324, graph optimizations 326 and/or partitioning 328. Static scheduling 322 of the appropriate instructions was described above.

PPA optimization 324 includes different optimizations of the computer program 350. For example, the allocation of MLN computations to Tiles may be optimized to reduce power consumption, to increase performance (such as reducing latency or increasing throughput) and/or to reduce area (e.g., number of Tiles used). Examples of this are described in FIG. 4.

For a given graph representation of an MLN, the number of computations required to execute the MLN is fixed. As a result, in one approach, the compiler may optimize to increase the utilization of compute resources in the Tiles—to keep the compute pipelines as busy as possible. However, for a Tile to execute a computation, the data for that computation must be available. This means that any prior computations must be completed and that those results must be transferred to the Tile doing the next computation. Thus, rather than focusing on computations, the compiler may optimize with respect to data transfer to reduce the wait times of computations. It may also allocate computations to Tiles in order to reduce data transfers between Tiles in the same mesh, to reduce data transfers from outside the MLA and/or to reduce data transfers that cross the boundary of the mesh (e.g., reducing data transfers between L1 and L2 memory and trying to keep all data in L1 memory).

The compiler 320 may also optimize 324 the computer program 350, subject to constraints on power, performance, area and/or any of the quantities described above. Graph optimization 326 includes analysis of the graph representing the MLN to prune, merge or quantize links, parameters, values, and layers to achieve better performance. Partitioning 328 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 350 may be loaded into memory for execution on a machine learning accelerator 370. For example, one possible application is object detection. In this case, the inputs are images captured by a video camera. The MLN 300 has been trained to identify certain objects in the video images. The computer program 350 implementing the MLN is loaded onto memory that is accessible by the MLA 370, which is implemented as a chip inside the camera. This way, images captured by the video camera may be immediately analyzed by the computer program 350 running on the MLA 370.

In addition to the MLA 370, the computer program 350 or parts of it may be run on a software simulator 336 and/or hardware emulator 338 (including FPGAs configured as MLAs). These may be used for product development, debugging and/or prototyping. For some purposes, a full simulation or emulation is not necessary. For example, to check that there are no collisions or conflicts between statically scheduled instructions, only the flow of data may be simulated or emulated. It is not necessary to compute actual values.

FIGS. 4A-4C illustrate three different computer programs for implementing a portion of an MLN (a subnet) on a set of Tiles. Each example implements the subnet $$Y=F(W1X1+W2X2+W3X3+W4X4) \qquad (2)$$

where Xn are matrices computed by prior nodes, Wn are corresponding weights, and F( ) is a non-linear operator. Pn are intermediate products. The implementation in FIG. 4A utilizes a low number of Tiles, the implementation in FIG. 4B has low latency, and the implementation in FIG. 4C has high throughput. In all of these figures, each row shows the instructions executed by a different Tile. Each column shows a different time period, where time is designated in cycles C. For purposes of this example, matrix multiplications are assumed to take 8 cycles, Tile to Tile transfers take 2 cycles, and all other instructions take 4 cycles.

In FIG. 4A, the compiler creates a computer program in which all of the instructions are executed by a single Tile 1. In cycles 1-4, Tile 1 loads the data for matrices W1 and X1 into its local memory (e.g., L1 memory). In cycles 5-12, Tile 1 executes the instruction to matrix multiply W1 times X1 and the result is stored in local memory for Tile 1. In cycles 13-24, Tile 1 repeats this process for W2 and X2. In cycles 25-28, Tile 1 adds the two partial products P1 and P2. This process repeats in cycles 29-60, at which point Tile 1 has computed the sum of all the matrix multiplications Wn times Xn. In cycles 61-64, Tile 1 executes the instruction to apply the nonlinear operator F. In cycles 65-68, the result Y is stored. Only one Tile is used to complete the computation, but the computation takes 68 cycles to complete.

In FIG. 4B, the computer program calculates Y with minimum latency, completing the computation in 32 cycles. In cycles 1-12, the partial products of Wn times Xn are computed for all of the n, using four separate Tiles. These partial products are then summed, but this requires some Tile-to-Tile data transfer. In cycles 13-14, the partial product P1 is transferred from Tile 1 to Tile 2. This is indicated by the Move command for Tile 1. [P1 available] for Tile 2 indicates that Tile 2 receives P1 as a result of the Move command executed by Tile 1.P1 is then summed with P2 by Tile 2 in cycles 15-18. In parallel during the same cycles, Tiles 3 and 4 sum P3+P4. This repeated in cycles 19-24 to sum the two partial sums P5+P6. Tile 4 applies the operator F( ) and then stores the result in cycles 25-32. The additional Tiles allow for hardware parallelism, particularly in computing the matrix multiplies. This shortens the total computation time from 68 cycles to 32 cycles.

In FIG. 4C, the computer program calculates Y in a manner that takes advantage of the hardware parallelism of FIG. 4B, but with higher throughput. Each Tile is responsible for one computation, with the result then transferred to other Tiles to perform other computations. Cycles 1-12 are the same as in FIG. 4B. Tiles 1-4 compute the partial products of Wn times Xn. However, these partial products P1-P4 are then transferred to Tiles 5-6, which sum P1+P2 and P3+P4, respectively, in cycles 13-18. These results are transferred to Tile 7, which sums them in cycles 19-24. The total sum P7 is transferred to Tile 8, which applies the operator F( ) in cycles 25-30. The overall computation takes somewhat longer than FIG. 4B (34 cycles versus 32 cycles) because this implementation has an extra Tile-to-Tile data transfer. However, a new input sample may be started in Tiles 1-4 after cycle 14, whereas a new input sample may not be started in Tiles 1-4 of FIG. 4B until after cycle 32.

Figure 5A:
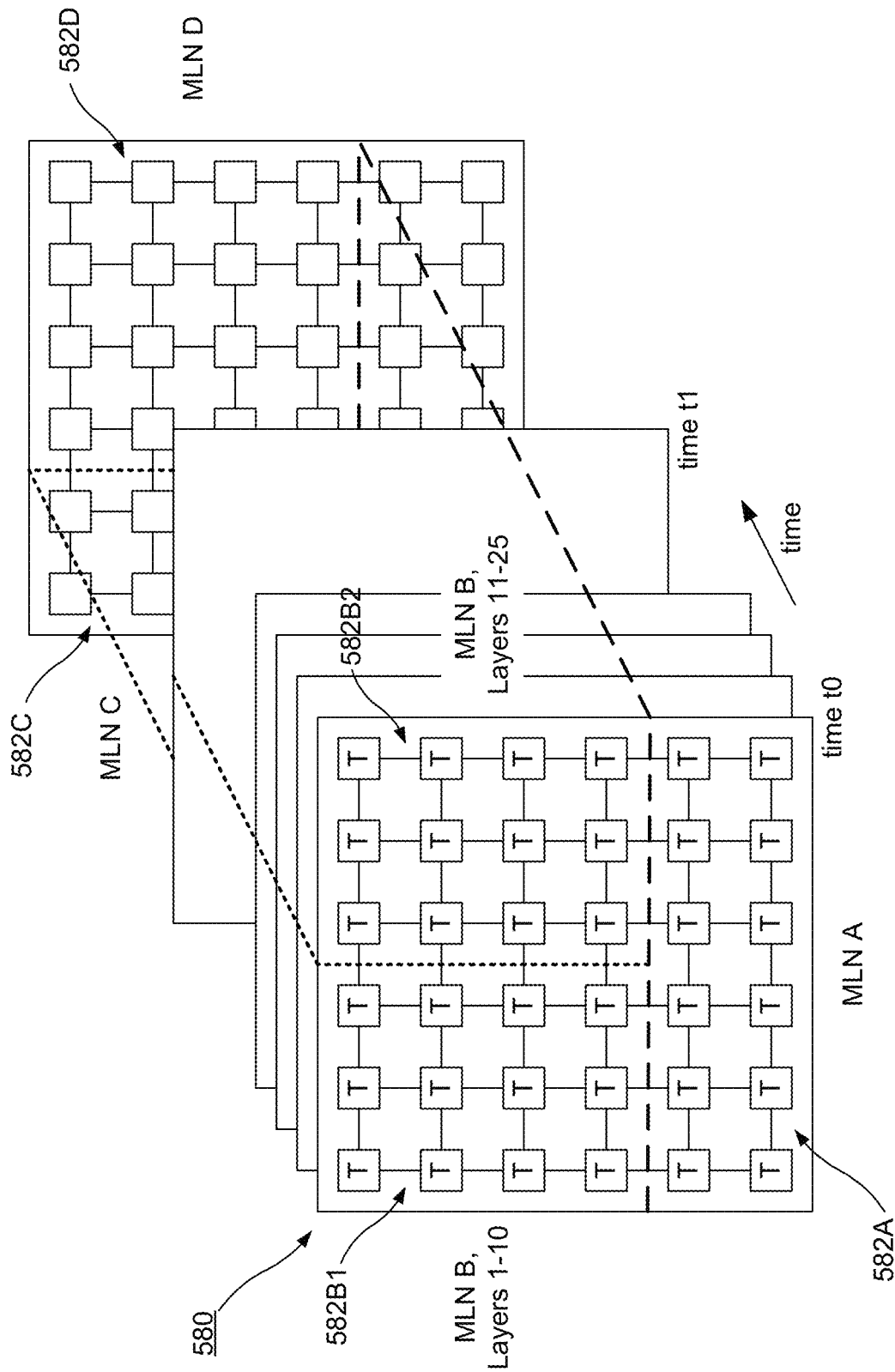
FIG. 5A illustrates partitioning a mesh of Tiles to execute different subnets.
Figure 5B:
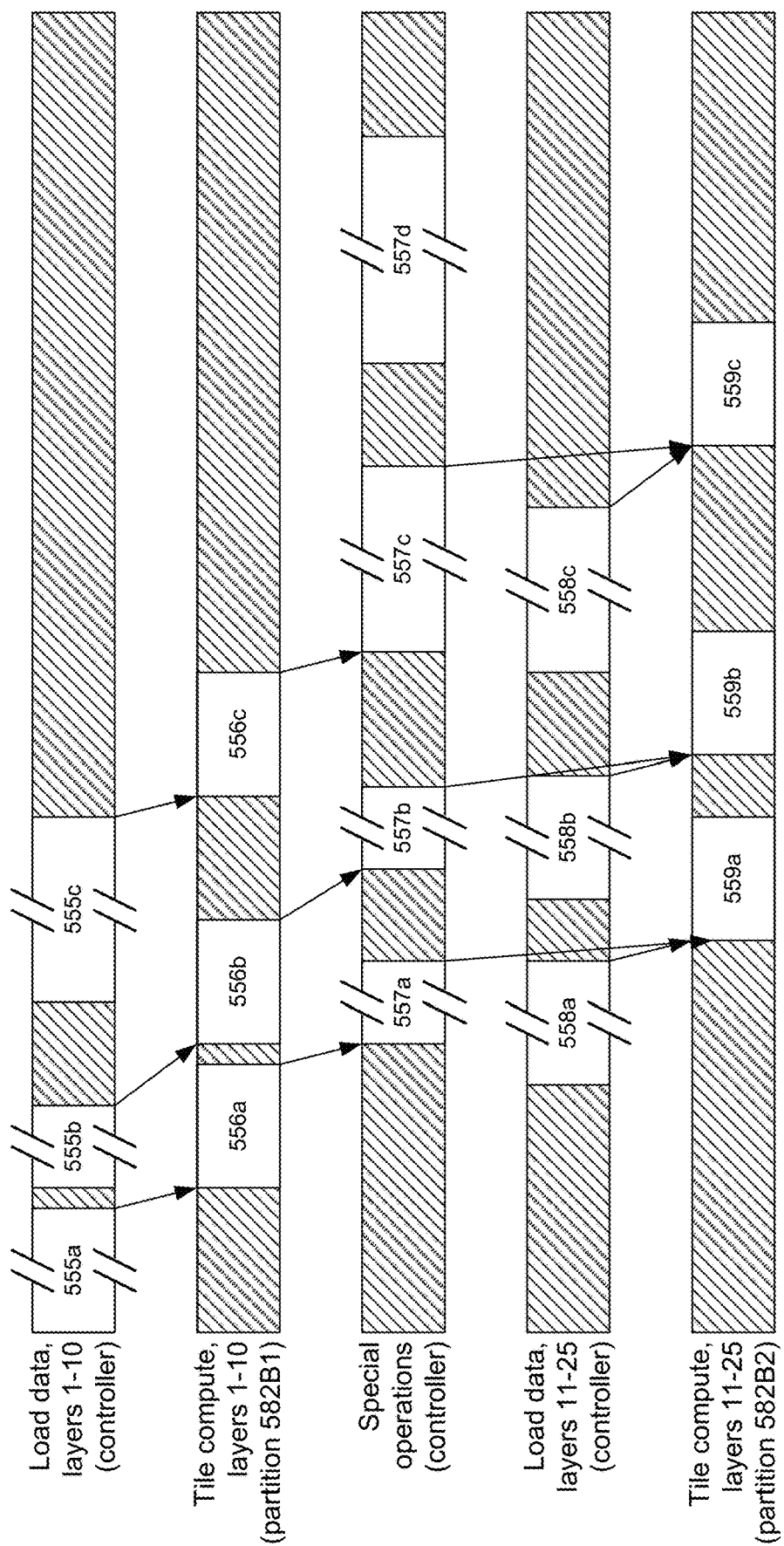
FIG. 5B illustrates deterministic and non-deterministic phases for different partitions.

FIG. 4 provided different examples of how a particular MLN subnet may be allocated to Tiles. FIGS. 5A and 5B illustrate partitioning the mesh of Tiles to different subnets. In FIG. 5A, the MLA includes a 6×6 mesh (element 580 in FIG. 5A) of Tiles. From time t0 to t1, the mesh 580 is utilized to implement two different MLNs: MLN A and MLN B. The Tiles are divided into three partitions 582A, 582B1 and 582B2. Partition 582A implements MLN A, partition 582B1 implements the first 10 layers of MLN B, and partition 582B2 implements the remaining 15 layers of MLN B. MLN B may be partitioned in this manner because some off-Tile operations may be required between layers 10 and 11. Maybe the output of layer 10 requires a computation that is performed off-Tile in a non-deterministic manner, or maybe layers 11-25 require data that cannot be loaded in a manner consistent with the static scheduling of layers 1-10. After time t1, the mesh 580 continues to implement MLN B using partition 582A, but MLN A is replaced by MLNs C and D using partitions 582C and 582D respectively.

FIG. 5A shows a progression over time. The front diagram shows the partitioning at an earlier time and the subsequent diagrams show the partitioning at later times. The times are indicated to the lower right of the diagrams. At time to, the mesh is partitioned so that the bottom 2×6 Tiles implement MLN A, the upper left 4×3 Tiles implement MLN B layers 1-10, and the upper right 4×3 Tiles implement MLN B layers 11-25. At time t1, MLN B is no longer required and is replaced by MLNs C and D. The upper left 4×2 Tiles now implement MLN C, and the upper right 4×4 Tiles now implement MLN D.

Note that each of these partitions may run deterministic and non-deterministic phases separately from each other. Partition 582A implements MLN A, which is independent of MLN B implemented by partitions 582B1 and 582B2. Thus, partition 582A may run separately from the other two partitions. At time t1, partition 582A may continue to run, unaffected by the change from MLN B to MLNs C and D.

FIG. 5B illustrates deterministic and non-deterministic phases for partitions 582B1 and 582B2. The format is similar to FIG. 1B. Each row represents different phases of instructions. The white regions of each row denote the execution of instructions and the hashed regions indicate idling. Non-deterministic phases are indicated by breaks in the rectangles. From top to bottom, the rows are the following. The top row has instructions to load data for the computations of layers 1-10 from DRAM into the MLA. This data will be consumed by Tile partition 582B1. Referring to FIG. 2A, this is performed by the controller 277 and these phases 555 are non-deterministic because they are loads from DRAM. The second row has the deterministic phases 556 of statically scheduled Tile instructions that implement the computations for layers 1-10. Similarly, the fourth row has non-deterministic phases 558 for loading data for the computation of layers 11-25, and the bottom row has the deterministic phases 559 of statically scheduled Tile instructions that implement these computations, respectively. The middle row has other non-deterministic instructions 557. In this example, this includes non-deterministic computations 557a-c that occur outside the MLA, and instructions 557d to repartition the MLA.

The suffixes indicate different input samples. The phases that end in -a apply the MLN to one input sample, the phases that end in -b apply the MLN to the next input sample, etc. The arrows indicate dependencies. Consider first input sample a. A controller loads 555a the relevant data (input values, weights, biases, operator parameters) from DRAM into the MLA memory. After this is completed, the Tiles 582B1 may perform their computations 556a using this data. The Tile output is transferred off-chip for a computation 557a that is not performed by the Tiles. In the meantime, the controller loads 558a the relevant data for layers 11-25. When data from both non-deterministic phases 557a and 558a are available, Tile partition 582B2 performs its computations 559a. The Tile computations within each phase 556a and 559a are statically scheduled within their respective non-deterministic phases, but the time between phases 556a and 559a may vary. The processing of input samples b and c have the same dependencies and general flow.

At some point (time t1 in FIG. 5A), the controller ends execution of MLN B and starts execution of MLNs C and D. The compiler has provided different schedules with different partitions of the Tiles as partition 582C for MLN C and partition 582D for MLN D. This is phase 557d. The process then continues with each of the active partitions 582A, C, D execution instructions to implement their respective MLNs.

The approach based on static scheduling described above is not restricted to the examples described above. For example, different network topologies of Tiles may be used. FIGS. 6-8 illustrate some other examples of different Tile meshes which may also be statically scheduled, so long as the time required to execute computations and to transfer data between Tiles is deterministic and may be determined at compile time.

In the previous example of FIG. 2, the Tiles in the mesh all had the same capability. Each Tile had a compute pipeline that could perform matrix multiplication and implement certain operators. Each Tile also had a data transfer pipeline to transfer data to and from its local L1 memory. This was just an example. FIGS. 6A-6D are block diagrams of meshes in which the Tiles have different capabilities.

Figure 6A:
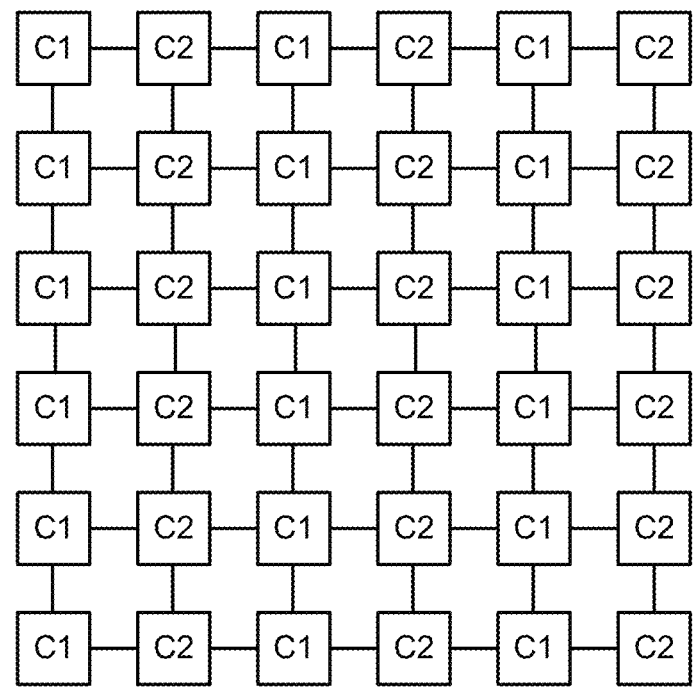
FIGS. 6A-6D are block diagrams of meshes in which the Tiles have different capabilities.
Figure 6B:
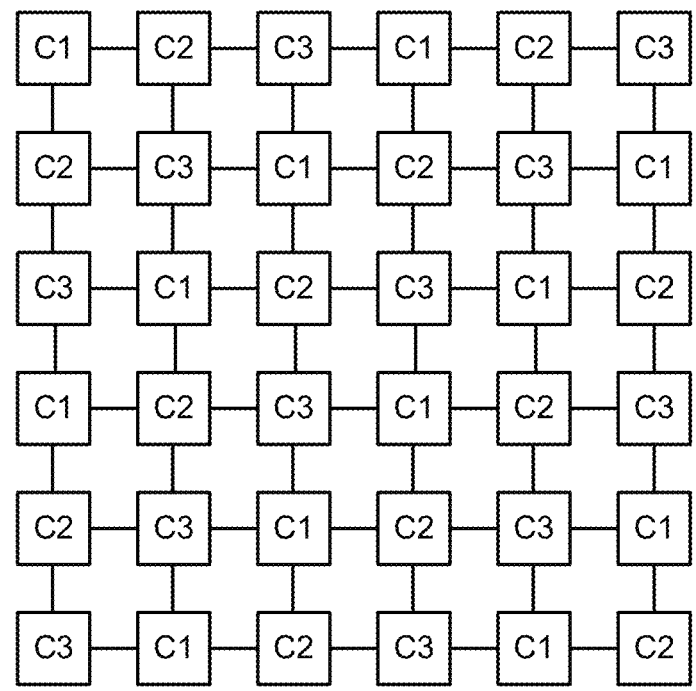

In the mesh of FIG. 6A, there are two different types of Tiles labeled C1 and C2. The C1 Tiles have one type of compute capability and the C2 Tiles have a different type of compute capability. For example, the C1 Tiles may be limited to matrix multiplication while the C2 Tiles apply certain operators (i.e., the different stage of the compute pipeline 285 in FIG. 2B is split into separate Tiles). In FIG. 6A, the Tiles are arranged in columns which alternate between the C1 and C2 capabilities. This may be a good layout for data flowing left to right, since it is common for MLNs to have matrix multiplications followed by operators. In the mesh of FIG. 6B, there are three types of tiles C1, C2 and C3. The Tiles are arranged in diagonals, so that no Tile is adjacent to another Tile with the same capability.

Figure 6C:
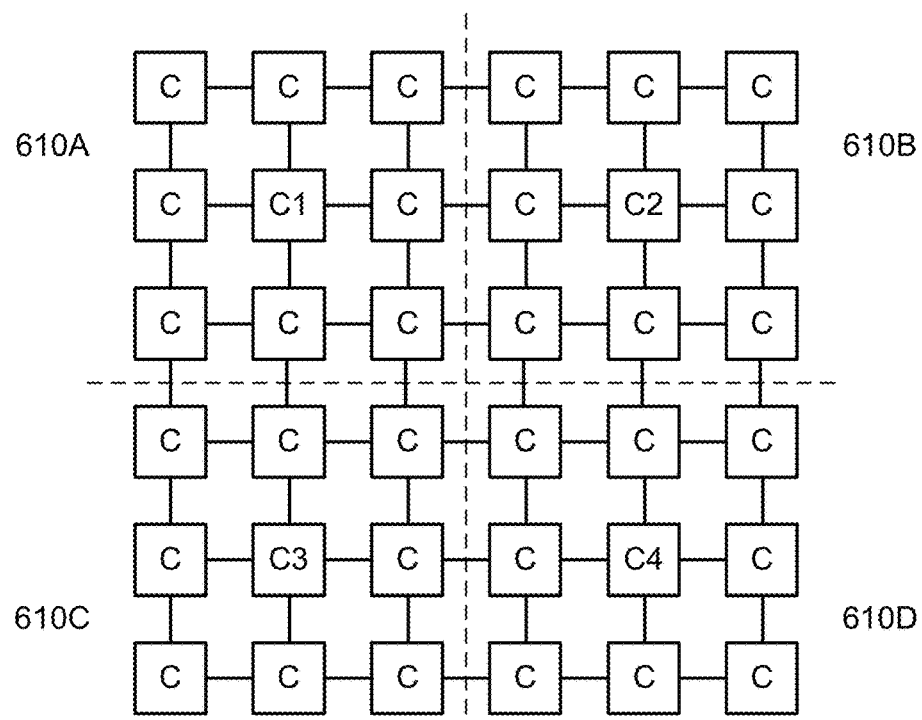
Figure 6D:
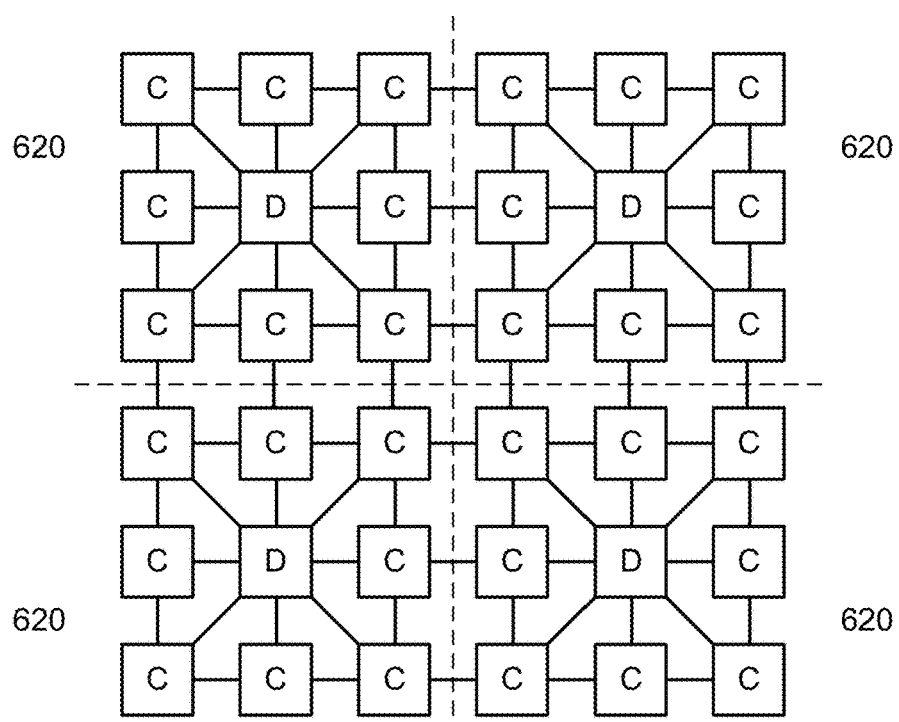

FIG. 6C shows a regular array of Tiles C with some Tiles that have special compute capability C1-C4. In this example mesh, the special Tiles replace some of the regular Tiles C in the array. The Tiles are arranged in clusters 610A-D as indicated by the dashed lines. Each special Tile is surrounded by eight regular Tiles. The mesh of FIG. 6D is similar to FIG. 6C, except that the special compute Tiles C1-C4 are replaced by Tiles D that only perform data transfer. These Tiles D act as instruction-driven switches to allow data transfer between any of the eight surrounding compute Tiles C in the cluster 620. Additional diagonal interconnects are added to allow data transfer between Tiles D and the corner Tiles C of each cluster 620.

FIGS. 7A-7D are block diagrams of meshes with different network topologies. In these figures, an arrow between two Tiles indicates a data transfer path between the two Tiles. Arrows which touch only one Tile indicate a data transfer path between that Tile and L2 memory. The arrowheads indicate the direction of data transfer, whether unidirectional or bidirectional. In FIG. 2A, the network interconnectivity of the Tiles was based on a rectangular array. Each Tile was connected to its immediate neighbors. The edge Tiles were also connected to L2 memory. This was just an example. Tiles could be connected to different numbers of other Tiles, for example. Other examples are described below.

Figure 7A:
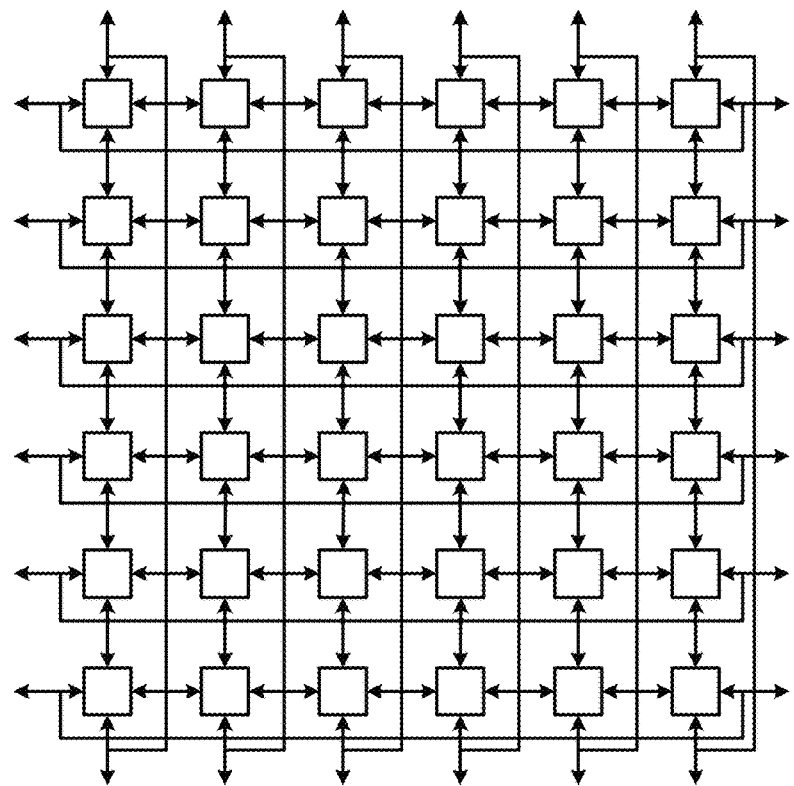
FIGS. 7A-7D are block diagrams of meshes with different network topologies.
Figure 7B:
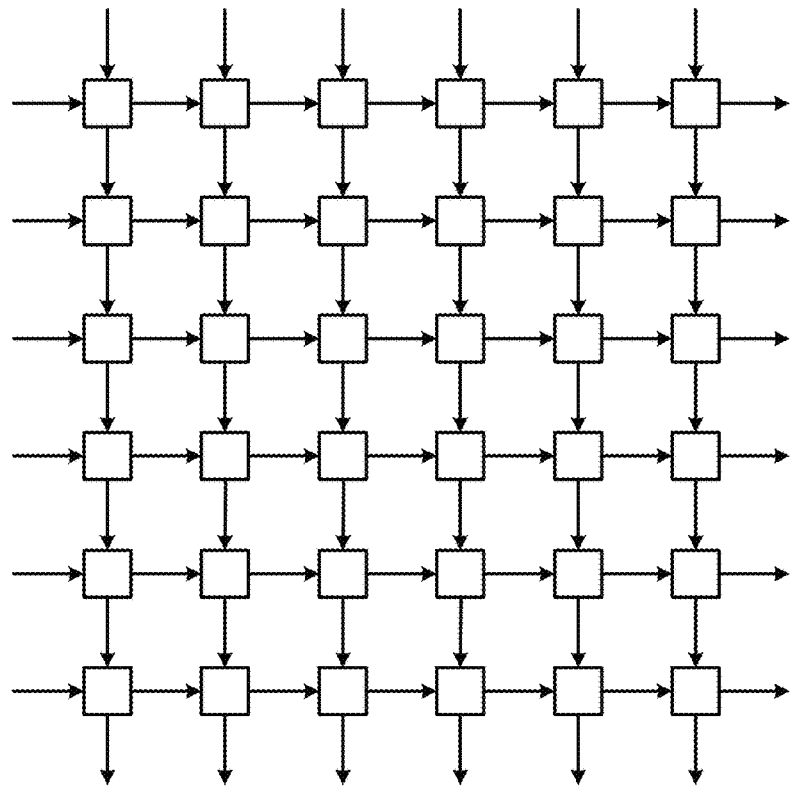

The mesh in FIG. 7A has the same network topology as in FIG. 2A, except that the edge Tiles are also connected to each other. Thus, data may be transferred between the leftmost and rightmost Tiles in any row and between the top and bottom Tiles in any column. In this example, all data links are bidirectional. The mesh in FIG. 7B has the same network topology as in FIG. 2A, except that all of the data links are unidirectional. Data has a preferred direction of flow from the top and left, to the bottom and right. This reduces the number of data transfer paths by half.

Figure 7C:
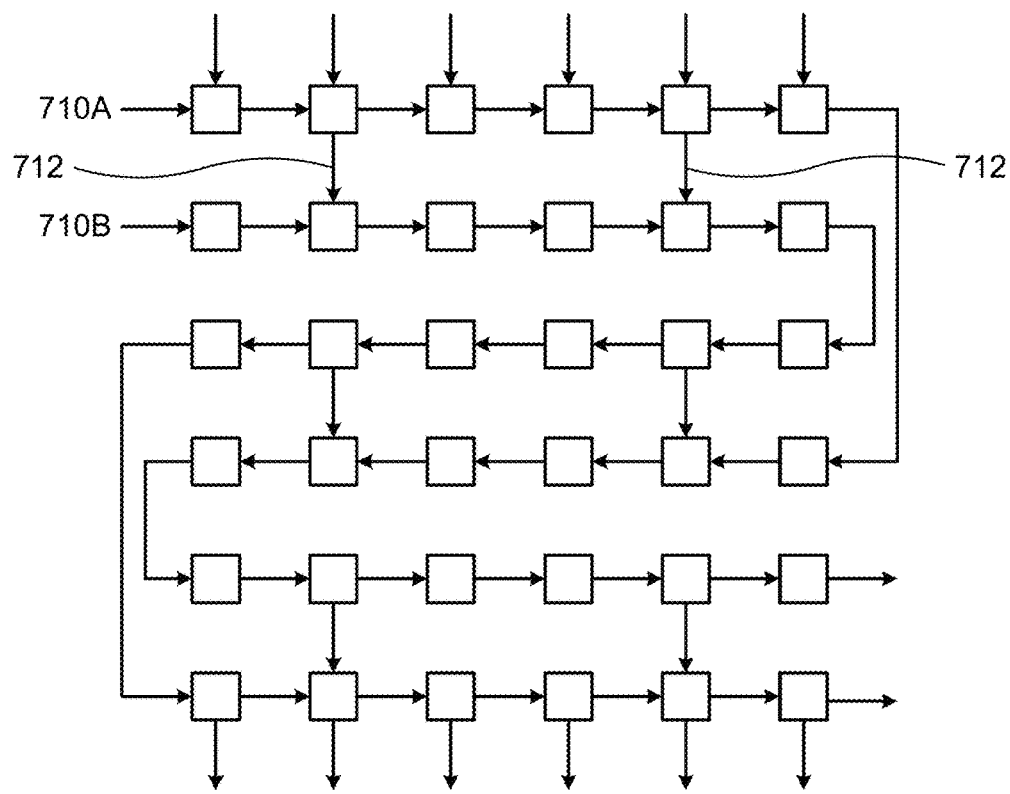

In FIG. 7C, the preferred direction of data flow is along two parallel tracks 710A and 710B, which snake from the upper left to the lower right. Every so often there are bridges 712 to allow data transfer between the two tracks 710.

Figure 7D:
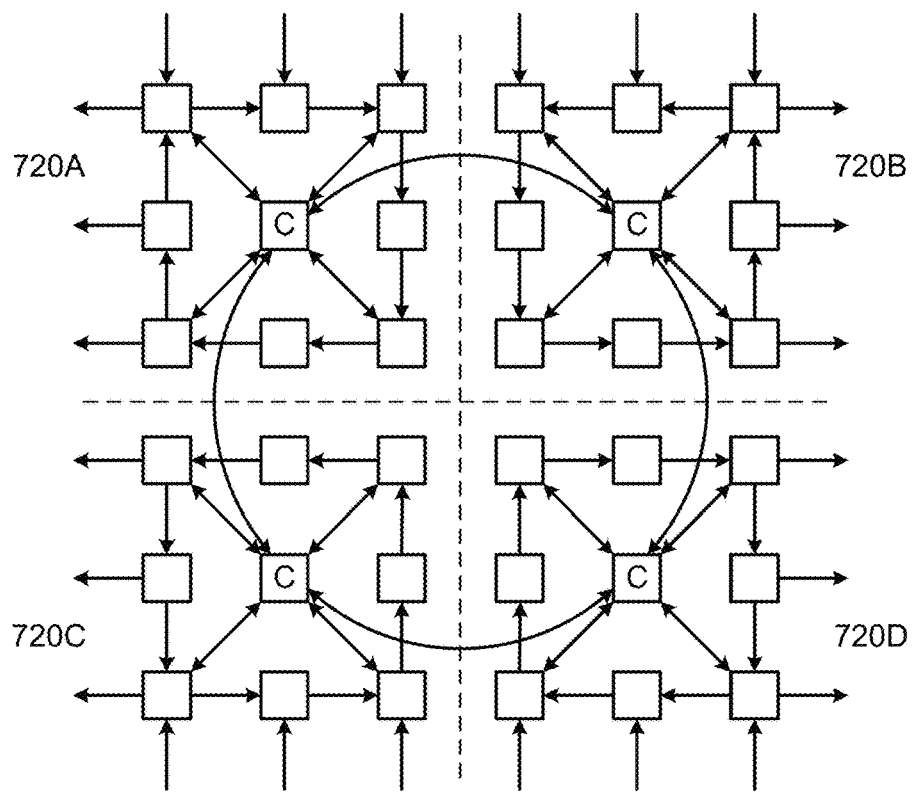

The network topology of FIG. 7D is based on clusters 720. For each cluster 720, a set of edge Tiles may receive data from L2 memory and another set of edge Tiles may transmit data to L2 memory. The Tiles in the cluster are arranged in a ring in a direction from the Tiles receiving data from L2 memory to the Tiles transmitting data to L2 memory. For example, in cluster 720A, the top three Tiles can receive data from L2 memory and the left three Tiles can transmit data to L2 memory. The eight outer Tiles in the cluster form a ring with data flow in the clockwise direction. Thus, data that enters the cluster from L2 memory may be processed by the Tiles in the ring before exiting the cluster back to L2 memory. The center Tile C may transfer data to and from any of the corner Tiles in the cluster. It may also transmit data around a higher level ring to the other center Tiles of the other clusters 720.

Figure 8A:
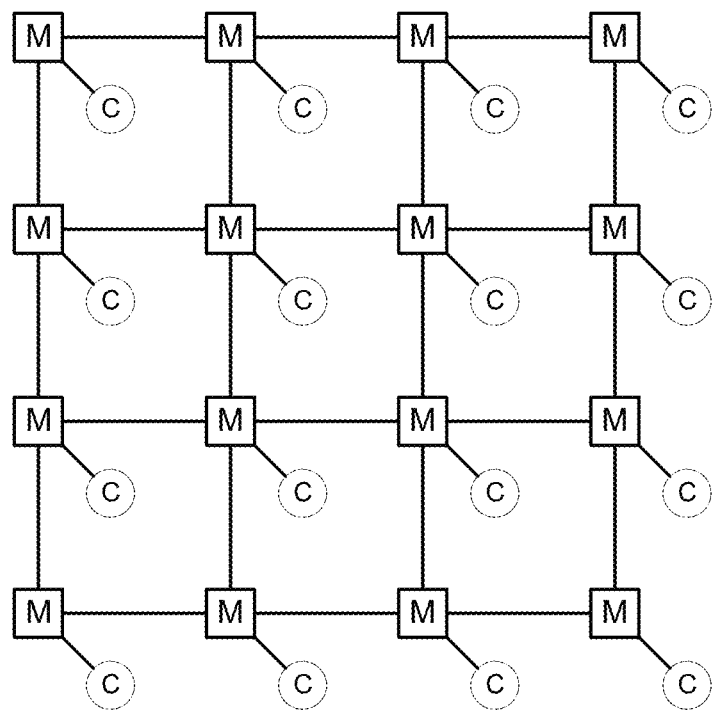
FIGS. 8A-8C are block diagrams of meshes with different arrangements of Tile memories.
Figure 8B:
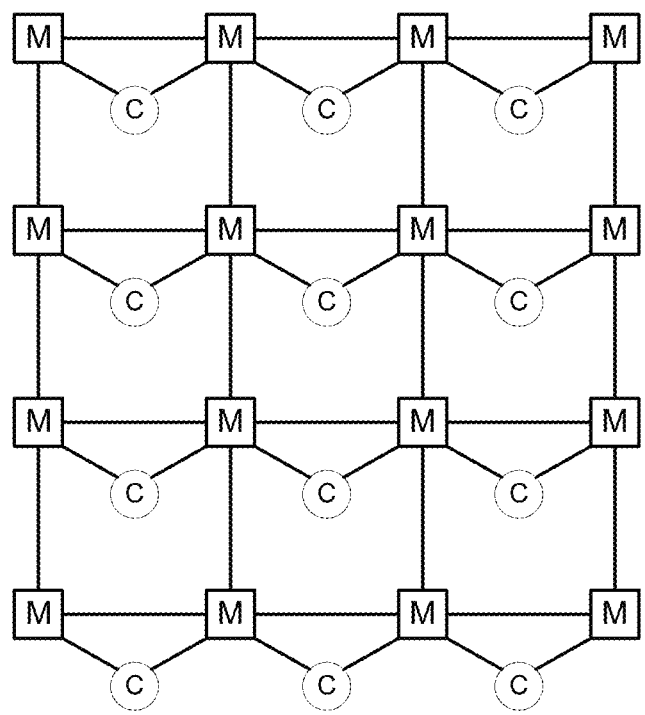
Figure 8C:
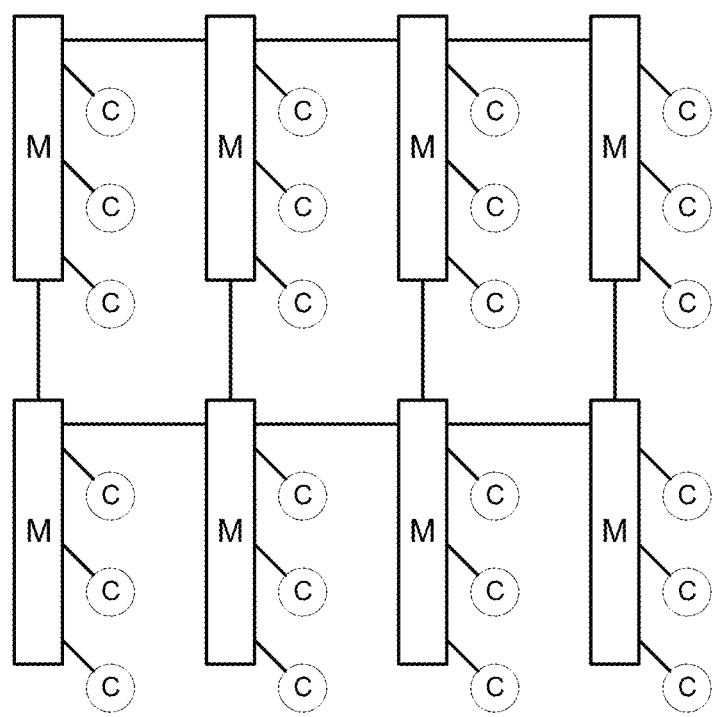

FIGS. 8A-8C are block diagrams of meshes with different arrangements of Tile memories. Tile memories are the local memory accessed by the Tiles (e.g., L1 memory in FIG. 2A). In these figures, the rectangle M represents a Tile memory and the circle C represents a Tile compute capability. The lines between M's are data transfer paths between memories. The lines between M and C indicate that compute capability C loads and stores data from that memory for its computation.

FIG. 8A shows the architecture described previously in FIG. 2. Each Tile memory M may transfer data to its adjacent neighbor. (In FIG. 2B, data may be transferred from L1 memory 282 to the L1 memory of an adjacent Tile.) Each of the compute capabilities C uses data from a dedicated local memory M. (In FIG. 2B, the compute pipeline 285 reads operands from L1 memory 282 and writes the result of its computation to L1 memory 282).

In FIG. 8B, the memories M are connected to each other in the same network as FIG. 8A. However, the compute capabilities C are each connected to two neighboring memories M. As a result, a compute pipeline C may read operands from one memory M, perform a computation and write the result to the adjacent memory. This saves a step of data transfer between the two memories.

In FIG. 8C, multiple compute capabilities C share a memory M. This is another way to transfer the result computed by one pipeline C to the input of another compute pipeline, without requiring an explicit data transfer between separate memories.

FIGS. 6-8 show some examples of different architectures for the mesh of Tiles. Other variations will be apparent. For example, the meshes could be irregular rather than a regular pattern. Furthermore, the mesh architecture could be instruction-driven or hardware configurable. For example, assume that all Tiles have capabilities C1, C2 and C3. The Tiles may be hardware configurable (like FPGAs) so that, if the architecture of FIG. 6A or 6B was desired, the Tiles could be configured for the specific capability C1, C2 or C3. Alternatively, the Tiles may be configured for capabilities C1, C2 or C3 by software instructions in the computer program. The unutilized capabilities may be idled, powered down or even disconnected (either temporarily or permanently). The same is true for the network topology and the memory architecture.

Figure 9:
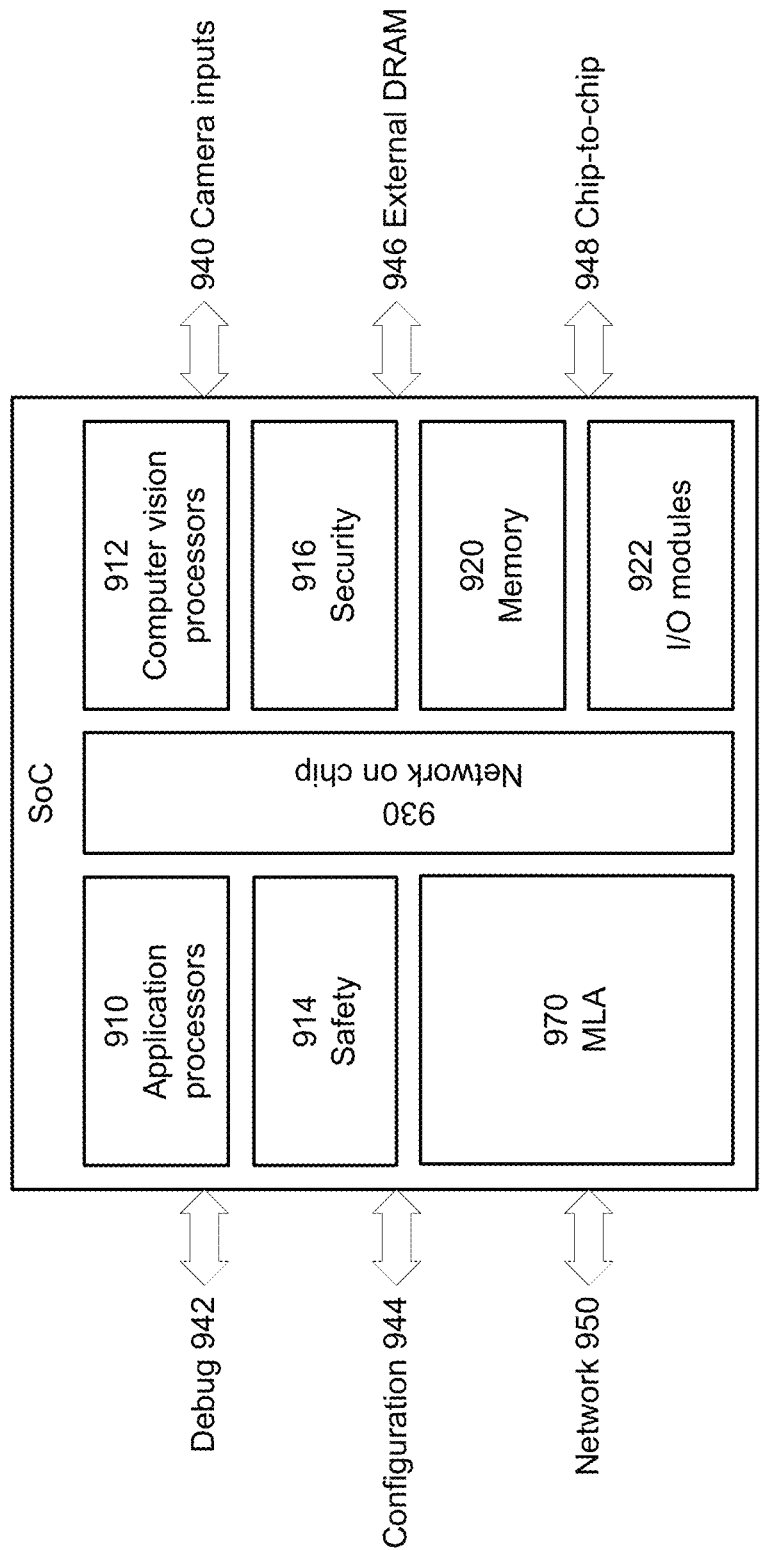
FIG. 9 is a block diagram of an integrated circuit product that includes an MLA.

FIG. 9 is a block diagram of an integrated circuit that includes an MLA 970. In other words, other components may be included on the same die as the MLA. This example includes the following additional blocks: application processor 910 (e.g., general purpose CPU running applications), computer vision processor 912 (or other types of application-specific processors), safety 914, security 916, additional SRAM (memory) 920 and input/output circuitry 922. It also includes a network 930 for communication between the different components. This type of semiconductor chip may be referred to as a system-on-chip (SoC).

The connections to the external world include camera inputs 940 for the computer vision processors, ports for debug 942 and configuration 944, a connection 946 to external memory (e.g., DRAM), chip-to-chip connections 948, and network connections 950 (e.g., Ethernet and PCIe).

The SoC of FIG. 9 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 912, which perform initial operations such as edge detection and enhancement, contrast enhancement, motion detection, and optical flow. Raw and/or processed images may be then input to the MLA 970 for analysis by the machine learning network. The MLA may also receive other inputs, such as metadata from other sources and data from other sensors. The application processors 910 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a performance of at least 50 TOPs (50 trillion operations per second) at a power consumption of not more than 5 watts. The performance may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A device that performs a task using a machine learning network, the device comprising:
    a machine learning accelerator (MLA) comprising a plurality of Tiles and associated on-chip memory on a semiconductor die, wherein the Tiles are organized into one or more meshes of interconnected Tiles; and
    non-transitory data storage that is not on the same semiconductor die as the Tiles and on-chip memory but is coupled to the MLA, the data storage storing an executable computer program that implements the machine learning network on the MLA, the computer program comprising deterministic phases of Tile instructions that implement computations in the machine learning network and non-deterministic phases that include instructions for data transfer between the on-chip memory and the non-transitory data storage; wherein the Tile instructions comprise (a) Tile compute instructions for performing computations in the machine learning network using data stored in the on-chip memory, and (b) Tile data transfer instructions for data transfer along data transfer paths between different Tiles and between Tiles and the on-chip memory;
    wherein each deterministic phase utilizes multiple Tiles with concurrent execution of Tile compute instructions and Tile data transfer instructions by different Tiles and the Tiles are configured to execute the Tile instructions within each deterministic phase according to a static schedule relative to the other Tile instructions in the same deterministic phase with unconditional start times for every Tile instruction within the same deterministic phase so that the Tiles execute the Tile instructions without any run-time determination of whether the data, Tiles or data transfer paths required for the Tile instructions are available; and
    a controller external to the mesh of Tiles, the controller configured to execute the instructions in the non-deterministic phases.

2. The device of claim 1 wherein the memory in the MLA comprises SRAM, and the non-transitory data storage comprises DRAM.

3. The device of claim 1 further comprising:
    a pipeline of one or more additional programmable processors that perform the task by executing instructions from the computer program, wherein the pipeline includes the MLA.

4. The device of claim 3 wherein the computer program configures the programmable processors into the pipeline.

5. The device of claim 3 wherein the pipeline also includes a general purpose CPU.

6. The device of claim 3 wherein the pipeline also includes an application-specific processor.

7. The device of claim 3 wherein all of the programmable processors in the pipeline are on the same semiconductor die as the MLA.

8. The device of claim 3 further comprising a master controller that coordinates operation of the MLA and the programmable processors in the pipeline.

9. The device of claim 3 further comprising one or more sensors that provide input samples to the pipeline.

10. The device of claim 9 wherein the input samples comprises images captured by the one or more sensors.

11. The device of claim 3 wherein the pipeline of programmable processors performs the task without utilizing remote compute resources.

12. The device of claim 1 wherein:
    the non-transitory data storage stores multiple executable computer programs for performing different tasks, each executable computer program comprising Tile instructions that implement computations in one of a plurality of corresponding machine learning networks used to perform the different tasks; and
    the Tiles are partitioned to simultaneously implement the corresponding machine learning networks for the different tasks.

13. The device of claim 1 further comprising:
    additional programmable processors;
    wherein the data storage stores multiple different executable computer programs, each computer program configuring some or all of the programmable processors and the MLA as different pipelines to perform different tasks.

14. The device of claim 1 wherein the task is a real-time task.

15. The device of claim 1 wherein the task is one of an agricultural task, an industrial task, a surveillance task and a robotics task.

16. The device of claim 1 wherein the task is one of a computer vision task, an image analysis task, an image understanding task, a speech recognition task, an audio analysis task, an audio understanding task, and a natural language processing task.

17. The device of claim 1 wherein the task is one of a health monitoring task, and a personalized health task.

18. The device of claim 1 wherein the device is an edge device.

19. The device of claim 1 wherein the device is a portable device.

20. The device of claim 1 wherein the MLA implements computations in the machine learning network at a speed of at least 50 trillion operations per second at a power consumption of not more than 5 watts.

* * * * *